United States Patent
De Cicco et al.

(10) Patent No.: US 9,532,062 B2
(45) Date of Patent: Dec. 27, 2016

(54) CONTROLLING PLAYER BUFFER AND VIDEO ENCODER FOR ADAPTIVE VIDEO STREAMING

(71) Applicant: Quavlive S.R.L., Bari (IT)

(72) Inventors: Luca De Cicco, Bari (IT); Saverio Mascolo, Irsina (IT)

(73) Assignee: Quavlive S.R.L., Bari (IT)

( * ) Notice: Subject to any disclaimer, the term of this patent is extended or adjusted under 35 U.S.C. 154(b) by 165 days.

(21) Appl. No.: 14/548,315

(22) Filed: Nov. 20, 2014

(65) Prior Publication Data
US 2015/0146778 A1    May 28, 2015

(51) Int. Cl.
| H04N 7/12 | (2006.01) |
| H04N 19/164 | (2014.01) |
| H04N 21/238 | (2011.01) |
| H04N 21/44 | (2011.01) |
| H04N 19/149 | (2014.01) |
| H04N 19/152 | (2014.01) |
| H04N 19/184 | (2014.01) |
| H04N 19/196 | (2014.01) |
| H04N 19/70 | (2014.01) |
| H04N 21/262 | (2011.01) |
| H04N 21/442 | (2011.01) |
| H04N 21/6373 | (2011.01) |
| H04N 21/845 | (2011.01) |
| H04N 19/30 | (2014.01) |
| H04N 19/115 | (2014.01) |

(Continued)

(52) U.S. Cl.
CPC ............ *H04N 19/164* (2014.11); *H04L 47/18* (2013.01); *H04L 47/30* (2013.01); *H04N 19/115* (2014.11); *H04N 19/149* (2014.11); *H04N 19/152* (2014.11); *H04N 19/184* (2014.11); *H04N 19/196* (2014.11); *H04N 19/30* (2014.11); *H04N 19/70* (2014.11); *H04N 21/23805* (2013.01); *H04N 21/26258* (2013.01); *H04N 21/44004* (2013.01); *H04N 21/44209* (2013.01); *H04N 21/6373* (2013.01); *H04N 21/8456* (2013.01)

(58) Field of Classification Search
None
See application file for complete search history.

(56) References Cited

U.S. PATENT DOCUMENTS

| 7,286,982 B2 * | 10/2007 | Gersho | ................ G10L 19/173 704/223 |
| 2002/0186769 A1 * | 12/2002 | O'Brien | ................ H04N 19/40 375/240.12 |

(Continued)

*Primary Examiner* — Kenny Lin
(74) *Attorney, Agent, or Firm* — Lewis Roca Rothgerber Christie LLP

(57) ABSTRACT

A mechanism is disclosed to adapt in real-time the encoding bitrate of a video source in an adaptive video streaming system with the aim of avoiding playback interruptions and to guarantee the best possible video quality. The mechanism is made of a feedback loop in which a controller computes the encoding bitrate that the sender (the video server) transmits to a receiver (client) employing a packet switching network such as the Internet. The mechanism can be used in video streaming systems employing scalable encoding (f.i. H.264 SVC, VP8, VP9) or multi bit-rate encoding (stream-switching). The automatic control that computes the video encoding bitrate can be executed either at the server or at the client.

4 Claims, 3 Drawing Sheets

(51) Int. Cl.
*H04L 12/801* (2013.01)
*H04L 12/835* (2013.01)

(56) References Cited

U.S. PATENT DOCUMENTS

| | | | | |
|---|---|---|---|---|
| 2005/0129123 A1* | 6/2005 | Xu | H04N 19/149 | 375/240.16 |
| 2005/0147163 A1* | 7/2005 | Li | H04N 19/197 | 375/240.12 |
| 2010/0034257 A1* | 2/2010 | Sedeffow | H04L 65/605 | 375/240.01 |
| 2011/0305273 A1* | 12/2011 | He | H04N 19/436 | 375/240.02 |
| 2013/0044801 A1* | 2/2013 | Cote | H04N 19/146 | 375/240.01 |
| 2013/0272383 A1* | 10/2013 | Xu | H04N 19/172 | 375/240.03 |
| 2013/0276048 A1* | 10/2013 | Krasic | H04N 21/2187 | 725/116 |
| 2013/0308436 A1* | 11/2013 | Li | H04N 21/23106 | 370/216 |

* cited by examiner

CONTROLLING PLAYER BUFFER AND VIDEO ENCODER FOR ADAPTIVE VIDEO STREAMING

This application is based and claims priority from Italian Patent Application No. BA2013A000077 filed Nov. 25, 2013 in Bari, Italy. This application includes matter protected by copyright.

BACKGROUND OF THE INVENTION

1. Technical Field

The present invention relates generally to techniques to automatically determine the encoding bitrate of the video source of an adaptive video streaming system. More precisely, it discloses a method to compute the encoding bitrate to deliver the best video quality to the user while avoiding playout interruptions and a method for efficiently scheduling the download of video segments.

2. Description of the Related Art

A video streaming system is composed of a sender (video server) that sends the video to a receiver (client) temporarily storing the video content in a queue, defined as playout buffer, that is drained by the player.

When the playout buffer gets empty, for instance due to a sudden decrease of the end-to-end available bandwidth, the player is paused to let a sufficient duration of video content to be stored in the playout buffer. At this point the player can resume the playback of the video. The mechanism described above is called re-buffering. In the paper entitled "Understanding the impact of video quality on user engagement" by F. Dobrian et al., presented at the ACM SIGCOMM conference in 2011, it has been shown that the duration and the frequency of re-buffering events are the main parameters negatively affecting the user perceived quality.

The goal of an adaptive video streaming system is to change in real-time the encoding bitrate of a video source, being it pre-recorded or live, to adapt it to the network available bandwidth so that playback interruptions due to re-buffering events can be avoided.

Today, such systems employ the HTTP over TCP to deliver the video instead of using protocols specifically tailored for streaming applications such as the Real Time Protocol (RTP) or the Real Time Streaming Protocol (RTSP) which use the UDP. This is the leading approach employed today by all the major video distribution platforms such as YouTube, NetFlix, Hulu, Livestream, Ustream.

In an adaptive video streaming systems the video produced by the encoder is divided in segments, or chunks, of a duration which is a multiple of the Group of Picture (GoP). The videos can be divided using two mechanisms: 1) the physical segmentation, 2) the logical segmentation.

The physical segmentation method requires the video to be physically divided into a number of files, one for each video segment. In this case the video segment is indexed by using its full path.

On the other hand, the logical segmentation requires the video to be logically divided. In this case a video segment is typically indexed using an index file specifying for each video segment its byte offset in the stored video file and the segment size in bytes.

Adaptive video streaming systems can be characterized based on two features: 1) the approaches employed to implemented adaptivity, 2) the employed control architecture.

Regarding the approaches that can be used to implement adaptivity we can divide the current proposals into the following three main categories.

1) Transcoding-based systems: they adapt the video content to the desired bitrate by changing in real-time the encoding bitrate of the raw video; such technique allows fine grained adaptation of the encoding bitrate to the available bandwidth, but it has the main drawback of requiring an encoding process for each video session; for this reason transcoding-based systems do not scale with the number of concurrent users.

2) Systems based on scalable codecs: such systems employ scalable codecs such as H.264 SVC, VP8, VP9. The raw video content is coded once and the encoding bitrate can be changed by exploiting the spatial and temporal scalability features of such codecs. With respect to the transcoding-based systems, this approach is more scalable since the encoding process is only made once.

3) Stream-switching or multi-bitrate systems: such systems encode the video in N versions, defined video levels, or representations; a control mechanism decides which video level should be sent to the receiver; such systems require N encoding processes for each video. This means that they have higher CPU and storage costs with respect to solutions based on scalable codecs, but they have the advantage of being codec agnostic, i.e. any encoder can be used.

Regarding the control architecture employed three different approaches can be employed as described in the following.

1) Client-side architecture: a controller placed at the client computes the encoding bitrate and sends such control signal to the video server; typically the mechanisms proposed in the literature employ bandwidth estimates as the controller input (see for instance the article entitled "Improving fairness, efficiency, and stability in http-based adaptive video streaming with festive." by Jiang et al presented at the 8th International Conference on Emerging Networking EXperiments and Technologies (CoNEXT), 2012).

2) Server-side architecture: the controller is placed at the server and computes the video bitrate to be sent to the client by employing measurements made at the server (for instance, bandwidth estimates, transmission buffer length as described in the article by L. De Cicco et al entitled "Feedback control for adaptive live video streaming." presented at the ACM conference on Multimedia Systems in 2011).

3) Hybrid architecture: in such architecture the control system can be distributed at the server and at the client; one such architecture is employed in the system proposed in the article by Akhshabi, Saamer, et al. entitled "Server-based traffic shaping for stabilizing oscillating adaptive streaming players" presented at the ACM Workshop on Network and Operating Systems Support for Digital Audio and Video (NOSSDAV), 2013 and in the video streaming system employed by Akamai and used by the LiveStreaming platform.

Today, leading adaptive video streaming platforms, such as YouTube and Netflix, employ the client-side control architecture with stream-switching control systems and they use the HTTP infrastructure, i.e. servers, proxies to deliver the video and web browsers to consume the received video content at the client.

Two main standards have been proposed in this technological context: 1) the MPEG-DASH (see the article "The mpeg-dash standard for multimedia streaming over the internet" by I. Sodagar in IEEE MultiMedia, 18(4):62-67, 2011) and 2) HTTP Live Streaming (HLS) by Apple. Both the standards employ a manifest file, stored at the video server, that is used to associate to each segment-video level pair its corresponding URL.

The article entitled "An experimental evaluation of rate-adaptation algorithms in adaptive streaming over HTTP" by S. Akhshabi et al. presented at ACM Multimedia Systems Conference in 2011 has shown that such systems typically employ two control mechanisms: 1) a mechanism, the stream-switch controller, that computes the encoding bitrate; 2) a mechanism to control the playout buffer level. Regarding stream-switching controllers, the mainstream approach is to compute the video encoding bitrate as a function of available bandwidth measurements.

In the same article it has been shown that such systems can be in one of the following two states: 1) buffering: this state is activated at the beginning of a video streaming session, or after a rebuffering event, and it is left when the playout buffer level increases above a target threshold; when the system is in this state a video segment is requested as soon as the download of the last segment has been completed; this state is needed to fill the playout buffer as quickly as possible; 2) steady-state: when the client is in this state, video segments requests are always issued every T seconds where T is the length of the segment measured in seconds; this means that, denoted with $T_d$ the time required to download a chunk, if $T_d<T$ the client will schedule the download of the next segment after an idle period of $T-T_d$.

It has been shown that the segment request mechanism employed when the client is at steady-state produces an ON-OFF traffic pattern with the main drawbacks described in the following.

1) In the article entitled "Performance of On-Off Traffic Stemming From Live Adaptive Segmented HTTP Video Streaming" by T. Kupka et al. presented at the IEEE Conference on Local Computer Networks in 2012 it has been shown that such ON-OFF traffic pattern leads to underutilization of the video server uplink bandwidth.

2) The same article also shows that concurrent video flows do not share fairly the same bottleneck.

3) In the article entitled "Confused, timid, and unstable: picking a video streaming rate is hard." by T. Huang et al. presented at the 2012 ACM conference on Internet measurement conference in 2012 it has been shown that when a video flow shares the bottleneck with a TCP greedy flow, such as in the case of a concurrent file download, the video flows are not able to get the fair share; the same article has shown that Netflix, Vudu and Hulu, three popular VoD video streaming systems, are affected by such issues.

BRIEF SUMMARY OF THE INVENTION

It is a primary object of the present invention to provide a mechanism to adapt in real-time the encoding bitrate of a video source in an adaptive video streaming system with the goal of avoiding playback interruptions and to guarantee the best possible video quality.

It is another primary object of the present invention to provide a method to schedule video segment downloads to avoid the ON-OFF download traffic pattern and the issues thereof as described in the related art section.

These and other objects and technical advantages are provided in the context of a video streaming system wherein a server (namely the sender) sends a video to the client (namely the receiver) over a packet switching network such as the Internet.

The general setting this invention can be employed is described in the following. More precisely, this invention describes an innovative controller which is in charge of computing the video encoding bitrate of a video source that has to be sent from a video server to a client which reproduces the received video, temporarily stored in a playout buffer, through a player. The controller computes its output based on the estimated end-to-end bandwidth measured by the bandwidth estimator module and the playout buffer length.

The present invention can be employed in an adaptive video distribution system to provide the user with the maximum video quality that is possible given the end-to-end bandwidth available from the server to the client.

Typical scenarios where the present invention can be used are described in the following.

1) Video on Demand (VoD): this relates to the distribution of pre-recorded videos such as in the case of movies, tv shows, tv series; 2) live video streaming: in this case the video content is produced by a live source such as a video camera; a typical scenario is that of tv shows, events, concerts, conferences, e-learning; 3) remote video distribution systems in high definition and 4K definition of live events that are played in theaters and cinemas; 4) video surveillance systems. Commercial platforms employing video distribution systems over the Internet are: YouTube, Livestream, Ustream, Netflix, Hulu, Vudu.

It is important to notice that the mechanisms disclosed in the present invention do not depend neither on the particular control architecture employed by the video distribution system, being it client-side or server-side, nor on the specific transport protocol employed (TCP, UDP, etc). Moreover, the invention can be used both with scalable video codecs (H.264 SVC, VP8, VP9) and multi-bitrate encoders.

It is further possible to use the present invention both with systems employing the MPEG-DASH (Dynamic Adaptive Streaming over HTTP) standard and with systems employing the HLS (HTTP Live Streaming) standard.

In the case the client-side control architecture is chosen, it is possible to implement the controller, for instance, using Adobe Flash, Microsoft Silverlight, or using the HTML5 standard by using the MediaSource API.

The video server can be any computer equipped with a packet switching network connection, such as the Internet, and with any operating system such as Windows 7, Windows 8, Windows NT, Windows XP, Linux, FreeBSD, OpenBSD, Mac OSX.

The client can be any device that is equipped with a network interface card through which it can connect to a packet switching network, for instance Internet, with a wired access network (ADSL, HDSL, optical fiber) or wireless access network (802.11b/g, GPRS, EDGE, UMTS, HSPA, LTE), or with a smartphone, a tablet equipped with any operating system such as Window 8, Linux, Android, iOS, Symbian OS, Tizen, Chrome OS, Firefox OS.

The foregoing has described only some of the more important features of this invention. These features should be interpreted as merely illustrative. Many other beneficial results can be achieved by using the disclosed invention in a different manner or by modifying it as it will be described in the Section "Description of the Preferred Embodiment".

BRIEF DESCRIPTION OF THE DRAWINGS

For a more complete understanding of the present invention and the advantages thereof, reference should be made to the following Section "Description of the Preferred Embodiment" taken in connection with the accompanying drawings in which.

DETAILED DESCRIPTION OF THE PREFERRED EMBODIMENT

The invention herein disclosed proposes a mechanism to dynamically adapt the encoding bitrate of a video source in an adaptive video streaming system such as for instance Netflix, Livestream, YouTube, Ustream. The invention can be employed in the field of massive distribution of video contents, such as in the case of WebTVs, Video on Demand (VoD), and live video streaming systems.

Figure 1:
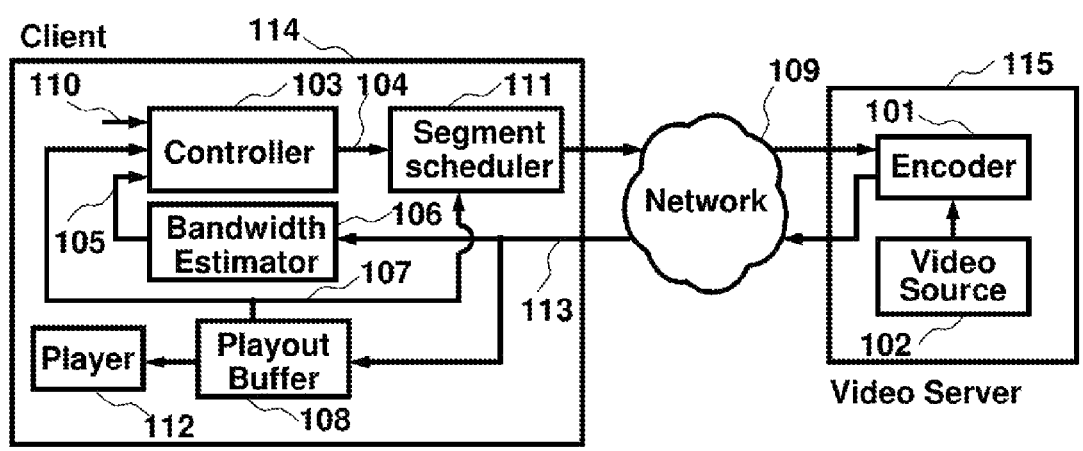
FIG. 1 is a representative system in which the present invention is implemented.

FIG. 1 shows a representative adaptive video streaming system composed of a client 114, namely "the receiver", that is connected to a video server 115, namely "the sender", through a packet switching network 109. A video source 102 is encoded, or compressed, by employing an encoder 101 that is placed on the video server 115.

The encoder 101 can compress the video source 102 at a configurable bitrate b(t) that can be realized by using one of the following techniques.

1) Scalable encoding (for instance H.264 SVC, VP8, VP9): the bitrate b(t) can be set to any value between a minimum value $B_{min}$ and a maximum value $B_{max}$.

2) Multi-bitrate or stream-switching: the encoder 101 produces in parallel N versions namely "representations" or "video levels" or "levels", at a different bitrate $l_1 < l_2 < \ldots < l_N$. In this case b(t) belongs to the discrete set $L=\{l_1, l_2, \ldots, l_N\}$.

It has to be noted that the present invention can be also used with the server-side control architectures that place the controller 103 on the video server 115.

The novelty of the present invention is placed in the following components.

1) The controller 103 that automatically determines in real-time the video encoding bitrate b(t) 104 as a function of the playout buffer 108 length q(t) 107 and of an estimate 105 of the rate r(t) at which the video has been received from the client 114.

The segment scheduler 111 that dynamically decides when to send the video segments according to the encoding bitrate b(t) 104 computed by the controller 103 and the playout buffer length q(t) 107.

More precisely, the goals of the controller 103 are: 1) to drive the playout buffer length q(t) 107 to a target level $q_T$ 110 and 2) compute the bitrate b(t) 104 as high as possible.

Another important novelty disclosed in this invention regards the segment scheduler 111 that avoids the generation of the ON-OFF traffic (see "Description of the Related Art") unless in the optimal condition when the end-to-end available bandwidth is higher than the maximum bitrate produced by the encoder 101.

The invention has the following advantages with respect to the state of the art described above: 1) the generated video flow is able to obtain the fair share when it is received simultaneously with a TCP greedy (or backlogged) flow; 2) the mechanism guarantees that when a number of video flows share the same bottleneck a high fairness is obtained.

In the Section 1 a possible use of the invention is disclosed in the case the adaptive video streaming system employs a multi-bitrate (stream-switching) encoder in a client-side control architecture (as shown in FIG. 1).

The description of the invention in a server-side architecture is not described for brevity since it does not differ significantly from the following description.

1. Description of the Invention when Employed in a Client-Side Video Streaming System Employing a Multi-Bitrate Encoder Adaptive video streaming systems employing multi-bitrate (or stream-switching) coding are based on an encoder 101 that produces in parallel a number N of representations, or video levels, of the same video source 102 at different bitrates and video resolutions. The set of the N video levels produced by the encoder is defined as the video levels set $L=\{l_1, l_2, \ldots, l_N\}$ where is the i-th video level bitrate ($l_1 < l_2 < \ldots < l_N$). To provide a concrete example, the video level set employed by Akamai HD Networks is L={350, 700, 1500, 2500, 3500} kbps with video resolutions varying from 240p up to 1080p. It is important to notice that the encoder 101 can employ any video codec such as for instance AVC/H.264, VP8, HEVC/H.265, VP9.

In the following description it is considered, without loss of generality, a video divided in M segments, or chunks, each with the same duration. Typical segment duration can be in the range between 1 second up to 10 seconds. The progressive number of the segment is denoted with the symbol $k \in \{1, 2, \ldots, M\}$.

Let $t_k$ be the time instant at which the client 114 issues the k-th segment request to the server 115 and $t_k^d$ be the time instant at which the same k-th segment is received by the client 114. Finally, $\Delta T_k = t_k^d - t_k$ denotes the time required to download the k-th video segment.

The innovation of the present invention lies in the two mechanisms described in the following: the controller 103 (Section 1.1) and the segment scheduler 111 (Section 1.2).

1.1 the Controller

The controller 103 disclosed in this invention selects the video level at a rate b(t) 104 among the video levels of the set $L=\{l_1, l_2, \ldots, l_N\}$ based on: 1) the estimated bandwidth r(t) 105 obtained as the output of the bandwidth estimator 106; 2) the level q(t) 107 of the playout buffer 108; the playout buffer 108 target $q_T$ 110.

The goal of the controller 103 is to automatically compute in real-time $b(t) \in L$ 104 so that q(t) 107 is driven in a neighborhood of $q_T$ 110 at steady state and that the video level chosen is the highest possible given the end-to-end available bandwidth.

Let us consider that the last received video segment by the client 114 is the (k−1)-th and that the next video segment to be downloaded is the k-th. The overall control system acts according to the steps described in the following.

The controller 103 computes the video level $b(t) \in L$ 104 and it provides this value to the segment scheduler 111 that has the task of issuing the requests to the video server 115 by specifying the number k of the next segment to be downloaded and the chosen video level 104.

This request is sent to the video server over a network connection by employing a specific application layer protocol. To give an example, such application layer protocol could be the HyperText Transfer Protocol (HTTP), the Real Time Streaming Protocol (RTSP), the Real Time Messaging Protocol (RTMP).

At this point the video server 115 selects the requested segment at the video level specified and it sends such segment through the network 109 to the client 114. The received segment 113 is then stored in the playout buffer 108 and it is employed by the bandwidth estimator 106 to compute a new estimate of the network bandwidth r(t) 105.

It has to be noted that, even though the typical embodiment of this invention employs the Transmission Control Protocol (TCP), the mechanism described herein can use any transport protocol such as the TCP, the User Datagram Protocol (UDP), the Datagram Congestion Control Protocol (DCCP).

Once the k-th segment has been received the cycle repeats and the controller 103 will determine the video level to be downloaded for the (k+1)-th segment.

To provide a concrete example, the following description shows a particular implementation of the controller in which a specific control law to select the video level and several mechanisms to estimate the used bandwidth 105 are disclosed.

1.1.1 A Representative Example of Implementation of the Controller

In the following description it is supposed that the last downloaded segment is the (k−1)-th. The controller 103 computes the bitrate $b(t_k) \in L$ 104 of the k-th segment to be requested to the video server 115 when the (k−1)-th segment download is completed, i.e. at the time instant $t_k = t_{k-1} + \Delta T_{k-1}$ where $\Delta T_{k-1}$ was the time required to download the (k−1)-th segment.

A possible implementation of the controller 103 is based on the following control law:

$$b(t_k) = Q\left(\frac{r(t_k)}{1 - K_1 \cdot q(t_k) - K_2 \cdot q_I(t_k)}\right) \quad (1)$$

where:
1) $q(t_k)$ is the length 107 of the playout buffer 108;
2) $r(t_k)$ is an estimate of the used bandwidth 105 performed by the bandwidth estimator 106;
3) $K_1$ and $K_2$ are two nonnegative constants;
4) $q_I(t_k) = q_I(t_{k-1}) + \Delta T_{k-1}(q(t_k) - q_T)$ is the integral of the error $q(t_k) - q_T$;
5) $Q: \Re \rightarrow L$ is an increasing function that maps any real number x to an element $l_i \in L$. One such component is needed in the case of a stream-switching system since the video bitrate 104 determined by the controller 103 can belong only to the discrete set L.

To obtain an estimate of the used network bandwidth $r(t_k)$ it is possible, for instance, to perform a low pass filtering of the download rate of the last segments. It is possible to use an EWMA filter that computes $r(t_k)$ as follows:

$$r(t_k) = \alpha \frac{D_{k-1}}{\Delta T_{k-1}} + (1 - \alpha) \cdot r(t_{k-1}) \quad (2)$$

where α is a real constant number between 0 and 1, $D_{k-1}$ is the size in bytes of the (k−1)-th segment. The term $D_{k-1}/\Delta T_{k-1}$ in eq. (2) represents the download rate of the (k−1)-th segment.

In another approach, the used bandwidth at time $t_k$ can be estimated as follows:

$$r(t_k) = \left(\frac{q(t_k) - q(t_{k-1})}{\Delta T_{k-1}} - 1\right) \cdot b(t_{k-1}) \quad (3)$$

where the meaning of the symbols in eq. (3) is the one given in the foregoing.

The function Q can be implemented, for instance, through a quantizer having an input-output relationship given by the following equation:

$$Q(x) = \begin{cases} l_1 & \text{if } x \leq l_2 \\ l_2 & \text{if } l_2 < x \leq l_3 \\ \vdots \\ l_i & \text{if } l_i < x \leq l_{i+1} \\ \vdots \\ l_{N-1} & \text{if } l_{N-1} < x \leq l_N \\ l_N & \text{if } x > l_N \end{cases} \quad (4)$$

It is possible to show that the error $q(t_k) - q_T$ is bounded, i.e. the length 107 of the playout buffer 108 is kept in a neighborhood of the target level $q_T$ 110. Moreover, it can be shown that the bitrate 104 chosen by the controller 103 at steady state is the maximum possible considered the value of the end-to-end available bandwidth.

1.2 the Segment Scheduler

The segment scheduler 111 issues the segment requests and acts in cooperation with the mechanism implemented by the controller 103 and described in the Section 1.1 "The controller". The segment scheduler 111 can be considered as the actuator of the controller 103.

Figure 2:
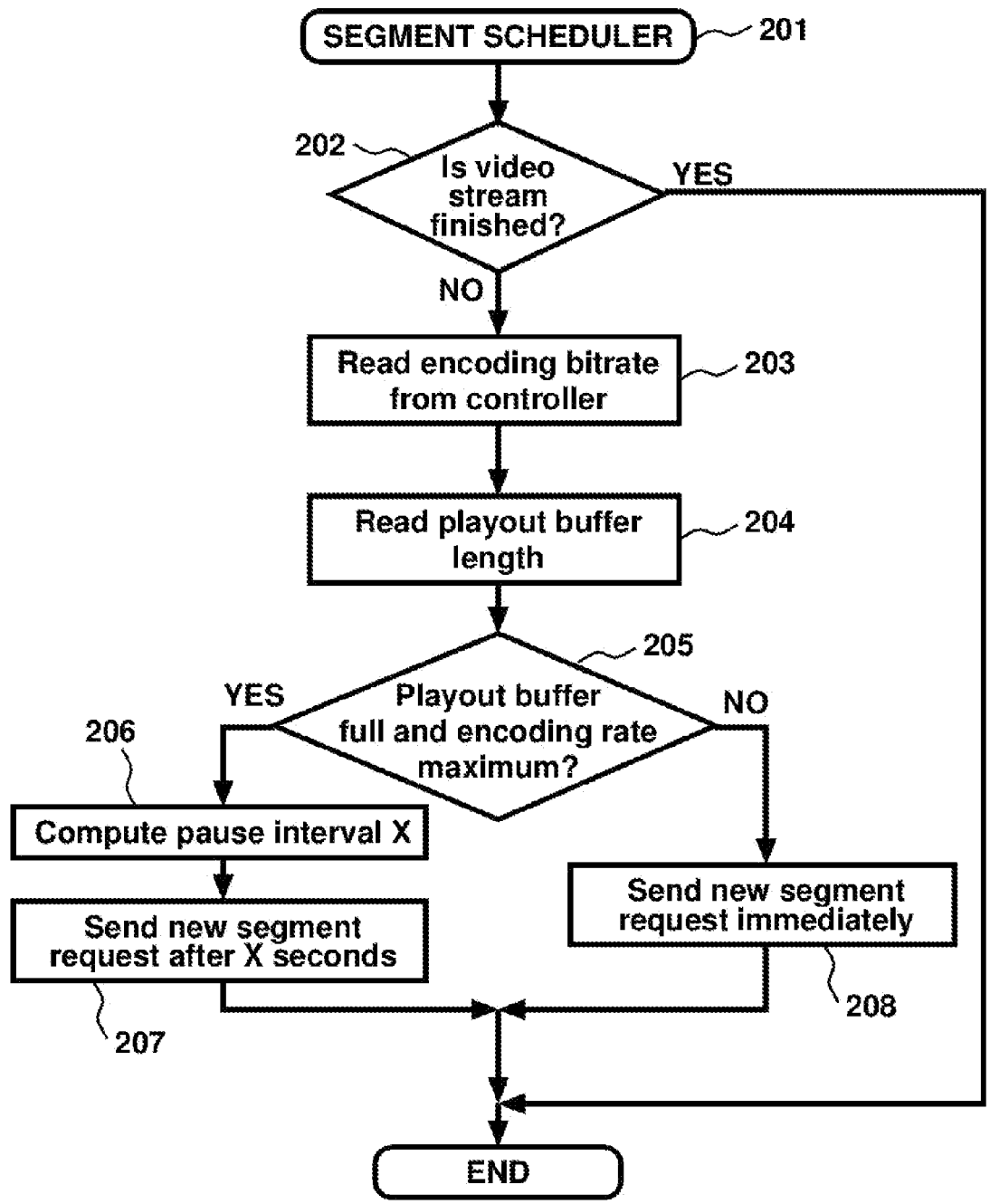
FIG. 2 is a flowchart illustrating how segment scheduling is implemented.
Figure 3:
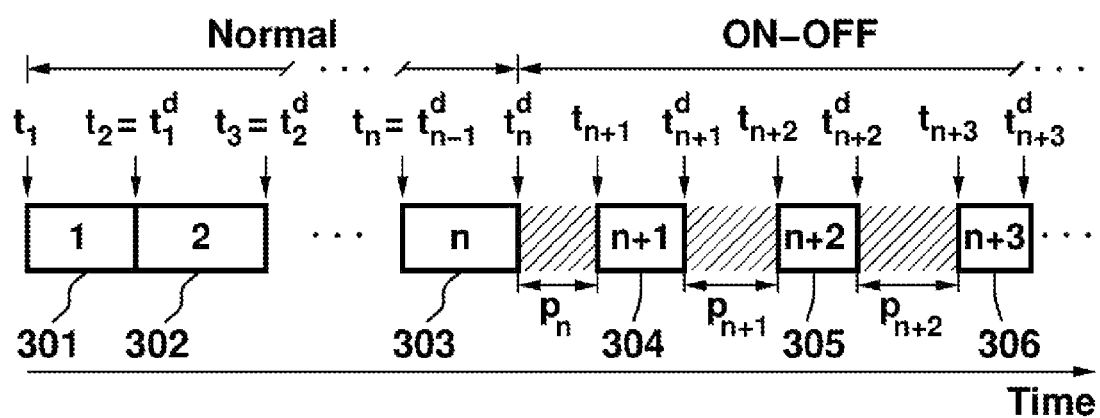
FIG. 3 is a diagram showing a possible temporal evolution of the video segment requests produced by the segment scheduler.

FIG. 2 shows a flowchart describing the steps required to implement the segment scheduling. FIG. 3 is a diagram showing a possible temporal evolution of the video segment requests produced by the segment scheduler 111: each segment is represented with a rectangle containing the number of the segment. For instance the segment number 1 is represented by the rectangle 301, the segment number 2 by the rectangle 302 and so on.

Two time instants are associated to each segment: $t_k$ represents the time instant when the k-th segment has been requested by the client 114; $t_k^d$ is the time instant when the k-th segment download has been completed.

FIG. 3 shows two possible modes of operation, or phases, of the segment scheduler namely the "Normal" phase and the "ON-OFF" phase. It is important to notice that such phases alternate an unspecified number of times that depends on the end-to-end available bandwidth, on the length 107 of the playout buffer 108 and on the encoding bitrate 104 computed by the controller 103.

In the example shown in FIG. 3 the first mode of operation, the Normal phase, begins with the request of the segment number 1 301 and ends when the segment number n 303 is requested; the second mode of operation, the ON-OFF phase, begins with the request of segment number n+1 304 and continues. In the following are described the mode of operation of the segment scheduler in each of the two phases.

1) Normal: a new segment is requested immediately after the last requested segment has been completely downloaded; this means that in such phase it holds $t_k = t_{k-1}^d$.

2) ON-OFF: a new segment is requested after an "idle period", computed by a processing device, has elapsed; when the segment scheduler 111 is in the ON-OFF phase it holds $t_k = t_{k-1}^d + p_k$ where $p_k \geq 0$ is the idle period of the k-th segment.

The FIG. 2, showing the flowchart of the segment scheduler mechanism, shows how the modes of operation are selected.

In the following description it is supposed, without loss of generality and only for illustrative purposes, that the last segment requested is the k-th and the next segment to be requested is the (k+1)-th.

1) The selection block 202 checks if the the last video segment requested was the last segment of the video; if the condition is true the segment scheduler mechanism stops. In the case the condition does not hold, i.e. the video has not been completely downloaded, the mechanism works as described in the following steps.

2) the block 203 of the segment scheduler reads the encoding bitrate 104 determined by the controller 103. The block 204 reads the length 107 of the playout buffer 108. A second selection block 205 checks if the current level of the playout buffer is greater or equal to a maximum threshold $Q_{max}$ and if the the current encoding bitrate read by the block 203 is greater or equal to the maximum encoding bitrate $l_N$.

2.a) If the two conditions of the selection block 205 are simultaneously true, it means that the segment scheduler is in the "ON-OFF" mode and the block 206 computes the idle period $p_k$. The block 207 issues the request for the (k+1)-th at the maximum encoding bitrate $l_N$ after the idle period $p_k$ has elapsed.

2.b) In the case one of the two conditions of the selection block 205 does not hold (i.e. either when the encoding bitrate is less than $l_N$ or if the playout buffer length is less than $Q_{max}$) the segment scheduler works in the "Normal" operation mode; in this case the block 208 immediately issues the request of the (k+1)-th segment at the bitrate read by the block 203.

The mechanism described in the foregoing avoids the ON-OFF traffic that is the cause of the issues reported in the Section "Description of the Related Art", in the hypothesis that the queue is less than $Q_{max}$ that the encoding bitrate 104 is less than its maximum value $l_N$. The ON-OFF traffic pattern holds only when the maximum possible video quality is obtained (since the computed encoding bitrate is equal to $l_N$) and when the playout buffer stores a large number of video segments. It can be said that the ON-OFF mode is active only when the maximum possible performance of the system has been obtained. It is important to notice that the "Normal" mode is re-established whenever one of the two conditions of the selection block 205 becomes false, for instance due to a temporary decrease of the available bandwidth.

1.2.1 A Representative Example of Implementation of the Segment Scheduler

In the following a possible implementation of the segment scheduler 201 is described where a particular mechanism 206 to compute the idle periods is disclosed.

The other steps of the segment scheduler mechanism are executed as described in the foregoing and are omitted for brevity.

We suppose that the selection block 205 has selected the "Yes" branch of FIG. 2 since only in this case the mechanism 206 is invoked. This means that the segment scheduler operates in the ON-OFF mode and that the encoding bitrate 104 computed by the controller 103 is equal to the maximum bitrate $l_N$. Moreover, we suppose, without loss of generality and for illustrative purposes only, that the time instant when the segment scheduler has been invoked is $t_k^d$, i.e. when the k-th segment download has been completed.

The block 206 computes the idle period $p_k$ that elapses from the instant $t_k^d$ the k-th segment download has been completed to the request of the (k+1)-th segment at the encoding bitrate $l_N$ by using the following equation:

$$p_k = \max(T_k - \Delta T_k^d, 0)$$

where $T_k$ is the duration, in seconds, of the k-th downloaded segment and $\Delta T_k^d = t_k^d - t_k$ is the time elapsed to download the k-th segment.

It is possible to show that with this mechanism the uncontrolled increase of the playout buffer length can be avoided.

What is claimed is:

1. A mechanism to automatically compute in real-time the encoding bitrate of a video source to be sent from a sender (server) to a receiver (client) over a packet-switched communication network comprising:

a first device, the playout buffer, placed on said client that stores the video received from said server;

a second processing unit, the player, placed on said client that drains the video from said playout buffer and reproduces the decoded video on the screen of said client;

a third device, the encoder, placed on said video server that encodes the video source at a bitrate b(t) that assumes continuous values in the range $[B_{min}, B_{max}]$ in the scalable encoder mode or a bitrate b(t) that assumes discrete values or levels in the set $L=\{l_1, l_2, \ldots, l_N\}$ in the multi-bitrate (or stream-switching) mode;

a fourth input interface placed on said client that reads the length q(t), measured in seconds, of said playout buffer;

a fifth device that estimates the network bandwidth r(t) used to send the video during the transmission;

a sixth processing unit, the controller, that computes the encoding bitrate b(t) based on the length q(t) of said playout buffer and the estimate of the network bandwidth r(t) computed by said fifth device; in the case said encoder is scalable $b(t) \in [B_{min}, B_{max}] \subset \mathbb{R}$, whereas in the case said encoder is multi-bitrate $b(t) \in L$;

a seventh processing unit, the segment scheduler, that requests the server to send video segments;

wherein:

the sixth processing unit computes the video encoding bitrate b(t) of said video source so that the playout buffer length q(t) reaches the positive target $q_T$ by using the following control law executed at sampling intervals of duration $\Delta T$:

$$b(t_k) = Q\left(\frac{r(t_k)}{1 + F(q_k, q_{k-1}, \ldots, q_T)}\right)$$

where:

$t_k = t_{k-1} + \Delta T$ is the k-th sampling time;

$q(t_k)$ is the playout buffer length read by the fourth input interface at the k-th sampling time;

$F(q(t_k), q(t_{k-1}), \ldots, q(t_{k-m+1}), q_T)$ is a function of the length of said playout buffer at the following sampling steps k, k−1, k−2, ..., k−m+1 (last m sampling steps) and of the queue target $q_T$;

$r(t_k)$ is the estimate of the used bandwidth computed by the fifth device at the k-th sampling interval;

$Q(\cdot)$ is an increasing function from the set of real numbers $\mathbb{R}$ to a value belonging to the set $[B_{min}, B_{max}] \subset \mathbb{R}$ in the case the encoder is scalable or to the discrete set $L=\{l_1, \ldots, l_N\}$ in the case the encoder is multi-bitrate.

2. A mechanism to automatically compute in real-time the encoding bitrate of a video source to be sent from a sender (server) to a receiver (client) over a packet-switched communication network according to claim 1 wherein:

the sixth processing unit computes the video encoding bitrate b(t) of said video source so that said playout buffer length q(t) reaches a positive target $q_T$ by using the following control law executed at sampling intervals of duration $\Delta T$:

$$b(t_k) = Q\left(\frac{r(t_k)}{1 - K_1 q(t_k) - K_2 q_I(t_k)}\right)$$

where:
$t_k = t_{k-1} + \Delta T$ is the k-th sampling time;
$q(t_k)$ is the playout buffer length read by the fourth input interface at the k-th sampling time;
$r(t_k)$ is the estimate of the used bandwidth computed by the fifth device at k-th sampling interval;
$K_1 e K_2$ are two nonnegative constants;
$q_1(t_k) = q_1(t_{k-1}) + \Delta T(q(t_k) - q_T)$ is the integral of the error $q(t_k) - q_T$;
$Q(\cdot)$ is an increasing function from the set of real numbers $\mathbb{R}$ to a value belonging to the set $[B_{min}, B_{max}] \subset \mathbb{R}$ in the case the encoder is scalable or to the discrete set $L = \{l_1, \ldots, l_N\}$ in the case the encoder is multi-bitrate.

3. A mechanism to automatically compute in real-time the encoding bitrate of a video source to be sent from a sender (server) to a receiver (client) over a packet-switched communication network according to claim 1 wherein:

the fifth device computes the estimate of the used bandwidth at sampling intervals of duration $\Delta T$ as follows:

$$r(t_k) = \left(\frac{q(t_k) - q(t_{k-1})}{\Delta T} - d(t_{k-1})\right) \cdot b(t_{k-1})$$

where:
$t_k = t_{k-1} + \Delta T$ is the k-th sampling time;
$q(t_k)$ is the playout buffer length read by the fourth input interface at the k-th sampling time;
$b(t_{k-1})$ is the bitrate of the video encoding rate computed by the sixth processing unit at the (k−1)-the sampling interval;
$d(t_{k-1})$ is a boolean variable that is equal to 1 when the video is playing, or 0 otherwise.

4. A mechanism according to claim 1 wherein the seventh processing unit, the segment scheduler, at the completion of the download of the k-th segment at time $t_k^d$, requests the video server to send the next (k+1)-th segment at time $t_{k+1} = t_k^d + p_k$ according to the following:

said sixth processing unit, the controller, computes the encoding bitrate $b(t_k^d)$;
said playout buffer length $q(t_k^d)$ is read by the fourth input interface;
if $b(t_k^d)$ is greater or equal to the maximum encoding bitrate $B_{max}$ ($B_{max}$ is equal to $l_N$ in the case said encoder is multi-bitrate) and the playout buffer length $q(t_k^d)$ is greater than or equal to a maximum threshold $Q_{max}$ the scheduler requests the video server to send the (k+1)-th segment at the maximum encoding bitrate $B_{max}$ after $p_k = \max(T_k - \Delta T_k^d, 0)$ seconds, where $T_k$ is the duration of the k-th segment and $\Delta T_k^d = t_k^d - t_k$ is the time spent to download the k-th segment;
if $b(t_k^d) < B_{max}$ or $q(t_k^d) < Q_{max}$ the segment scheduler immediately, at time $t_k^d$, requests the (k+1)-th segment encoded at the rate $b(t_k^d)$.

* * * * *